(12) United States Patent   (10) Patent No.: US 7,485,342 B2
Kawamori                    (45) Date of Patent:     Feb. 3, 2009

(54) METHOD OF FORMING SPACER OF DOUBLE GLAZING

(75) Inventor: Yuji Kawamori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 105 days.

(21) Appl. No.: 10/559,539

(22) PCT Filed: Jun. 25, 2004

(86) PCT No.: PCT/JP2004/008973

§ 371 (c)(1),
(2), (4) Date: Dec. 2, 2005

(87) PCT Pub. No.: WO2005/000763

PCT Pub. Date: Jan. 6, 2005

(65) Prior Publication Data

US 2006/0269681 A1   Nov. 30, 2006

(30) Foreign Application Priority Data

Jun. 25, 2003  (JP) .............................. 2003-180715

(51) Int. Cl.
*B05D 1/26*  (2006.01)
(52) U.S. Cl. ........................ 427/287; 427/165; 427/284; 427/286
(58) Field of Classification Search .................. 427/165, 427/284, 286, 287
See application file for complete search history.

(56) References Cited

U.S. PATENT DOCUMENTS 4,234,372 A * 11/1980 Bernhard et al. ............. 156/356

FOREIGN PATENT DOCUMENTS

| EP | 1 236 559 | * | 9/2002 |
|----|-----------|---|--------|
| JP | 08-067537 |   | 3/1996 |
| JP | 10-110072 |   | 4/1998 |
| JP | 10-1100072 | * | 4/1998 |
| JP | 10-511072 |   | 10/1998 |
| JP | 11-107643 |   | 4/1999 |
| JP | 2000-119537 |   | 4/2000 |
| JP | 2000-246780 |   | 9/2000 |
| JP | 2001-354949 |   | 12/2001 |

OTHER PUBLICATIONS

International Search Report.

* cited by examiner

*Primary Examiner*—Frederick J Parker
(74) *Attorney, Agent, or Firm*—Greer, Burns & Crain, Ltd.

(57) ABSTRACT

A method of forming a spacer of double glazing according to the present invention that forms a spacer by applying a spacer forming material from an applicator head for applying the spacer forming material while the applicator head is being moved by a multi-joint robot along the periphery of the upper surface of one glass plate. The spacer forming material is discharged form the discharge port of the application head in the linear regions of the periphery, and discharging of the spacer forming material is stopped form the discharge port of the application head in the corner regions of the periphery. During stopping of the discharge, the application head is rotated to change the direction of the discharge port to a direction suitable for application in the next linear region that follows the corner region.

5 Claims, 3 Drawing Sheets

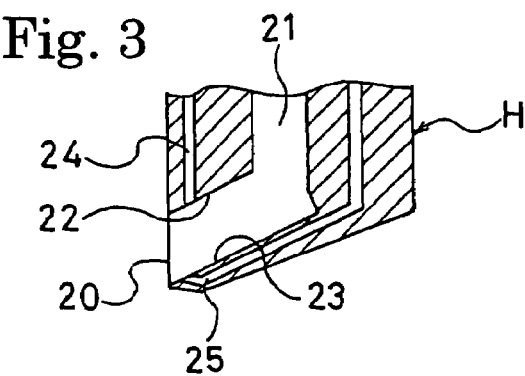
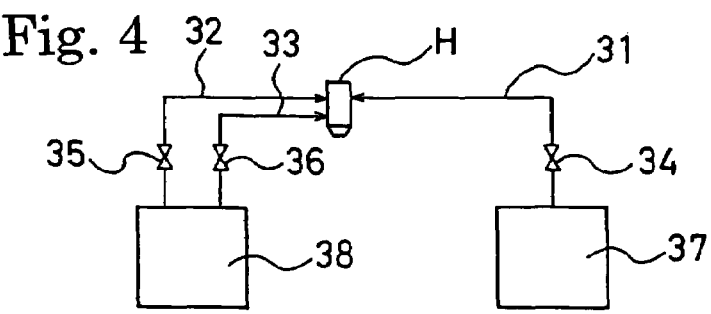
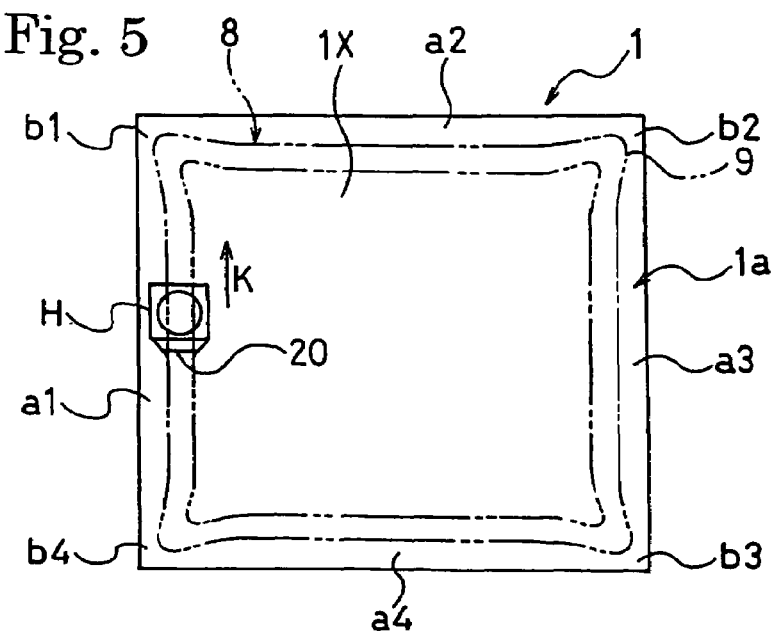

METHOD OF FORMING SPACER OF DOUBLE GLAZING

TECHNICAL FIELD

The present invention relates to a method of forming a spacer of double glazing, and more particularly, relates to a method of forming a spacer of double glazing capable of improving productivity.

TECHNICAL BACKGROUND

In a construction field, an automobile field and the like, double glazing has been heretofore used for the purpose of heat insulation, dew condensation prevention, sound insulation and the like. As such double glazing, there is known double glazing having glass plates, a spacer placed between the peripheries of the glass plates and an airtightly sealed air space formed between the glass plates, the spacer being formed of rubber, resin or the like having a drying agent mixed therein, the airtightly sealed air space being shut out from ambient air (see Japanese patent application Kokai publication Nos. 10 (1998)-110072 and 2001-354949, for example).

When double glazing as described above is manufactured, the following two methods of forming a spacer have been well known (see Japanese patent application Kokai publication Nos. 8 (1996)-67537 and 10 (1998)-511072, for example). One is a method of forming a spacer by extruding a spacer forming material along and between the peripheries of two glass plates held with a predetermined space therebetween. The other is a method of forming a spacer by extruding a spacer forming material along the periphery of the upper surface of one glass plate before the other glass plate is press-attached thereon.

In the latter method, a multi-joint robot having an applicator head for applying a spacer forming material is used, and while the applicator head is being moved by the multi-joint robot along the periphery of the upper surface of one glass plate which is horizontally held, the spacer forming material is applied at a constant application amount to automatically form the spacer. When the applicator head reaches each corner of the glass plate, the multi-joint robot rotates the applicator head to change the direction of the discharge port of the applicator head that discharges the spacer forming material.

Recently, due to the intensifying competition among companies, reduction in costs of double glazing has been demanded. Therefore, in the foregoing method using the multi-joint robot, if productivity is improved by increasing the movement speed (60 mm/sec. or more) of the applicator head to reduce costs, a large amount of spacer forming material runs off a predetermined application area outward in each corner region of the glass plate, thereby deteriorating the appearance of the spacer that has been formed. This is because it is structurally impossible to make the rotation speed of the applicator head follow the increased movement speed of the applicator head.

Consequently, in the process of automatically forming a spacer by use of a multi-joint robot, the applicator head is moved along the periphery at a constant speed in accordance with the rotation speed of the applicator head in order to obtain a good spacer shape. Thus, the movement speed of the applicator head, that is, the speed of forming a spacer has to depend on the rotation speed of the applicator head, which hinders improvement in productivity.

DISCLOSURE OF THE INVENTION

It is an object of the present invention to provide a method of forming a spacer of double glazing capable of forming a spacer having a good appearance without depending on the rotation speed of an applicator head and of improving productivity.

In order to achieve the above object, the present invention provides a method of forming a spacer of double glazing by using a multi-joint robot to which an applicator head for applying a spacer forming material is rotatably attached and by applying the spacer forming material from the applicator head while the applicator head is being moved by the multi-joint robot along a periphery of an upper surface of one glass plate, the application head having a discharge port for the spacer forming material, which is directed to one direction, the periphery of the glass plate having linear regions and corner regions which follow the linear regions, the method comprising the steps of discharging the spacer forming material from the discharge port of the applicator head in each linear region; stopping the discharge of the spacer forming material from the discharge port of the applicator head in each corner region; and rotating the application head in each corner region to change the direction of the discharge port of the applicator head to a direction suitable for application in the next linear region which follows the corner region.

According to the present invention described above, since discharging of the spacer forming material from the discharge port of the applicator head is stopped in the corner regions, a large amount of the spacer forming material do not run off a predetermined application area in the glass plate outward. Therefore, even if the applicator head that applies the spacer forming material is moved at a high speed in the linear regions without depending on the rotation speed of the applicator head while the applicator head is moved at a speed corresponding to the rotation speed of the applicator head or lower in the corner regions, the spacer with a good appearance can be formed. Accordingly, the spacer having a good appearance can be formed without depending on the rotation speed of the applicator head in the linear regions, and productivity can be improved.

BRIEF DESCRIPTION OF THE DRAWINGS

FIG. 3 is a partially enlarged cross-sectional view of an applicator head used in the method of forming a spacer of double glazing according to the present invention.

FIG. 4 is an explanatory view showing spacer forming material supply means and primary sealing agent supply means which are connected to the applicator head.

FIG. 5 is a plan view showing the method of forming a spacer of double glazing according to the present invention.

BEST MODES FOR CARRYING OUT THE INVENTION

With reference to the accompanying drawings, an embodiment of the present invention will be described in detail below.

Figure 1:
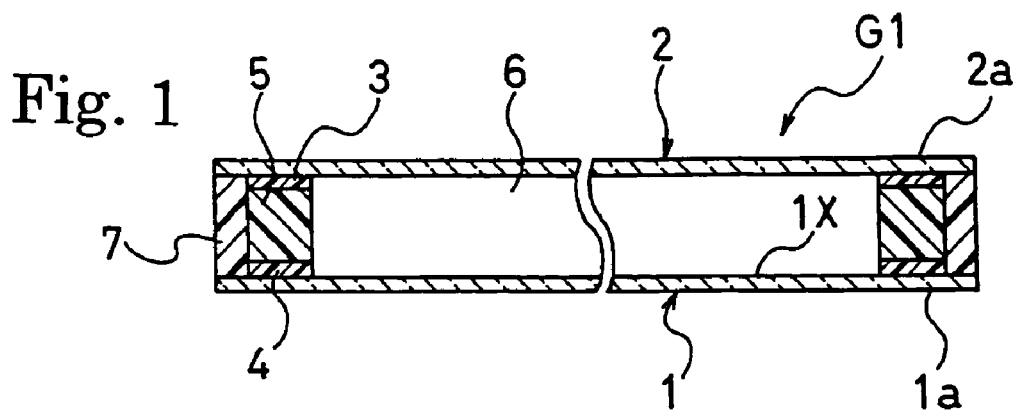
FIG. 1 is a cross-sectional view showing one example of double glazing having a spacer formed by use of a method of forming a spacer of double glazing according to the present invention.

FIG. 1 shows one example of double glazing having a spacer formed by use of a method of forming a spacer of double glazing according to the present invention. Double glazing G1 shown in FIG. 1 has rectangular glass plates 1 and 2, and a spacer 5 with primary sealing agent layers 3 and 4 on its upper and lower surfaces, disposed between the peripheries 1a and 2a of the glass plates 1 and 2. An airtightly sealed air space 6 surrounded by the spacer 5 is formed between the glass plates 1 and 2. A secondary sealing agent layer 7 is provided outwardly of the spacer 5 between the glass plates 1 and 2.

The double glazing G1 described above is obtained by forming a spacer 5 on the periphery 1a of the upper surface 1X of one glass plate 1 which is horizontally placed, cooling the spacer 5, then press-attaching the other glass plate 2 thereon, and forming a secondary sealing agent layer 7. The method of forming a spacer of double glazing according to the present invention is used to form the spacer 5 of double glazing G1 as described above.

With reference to FIGS. 2 to 6, an embodiment of the double glazing spacer forming method of the present invention will be described below.

Figure 2:
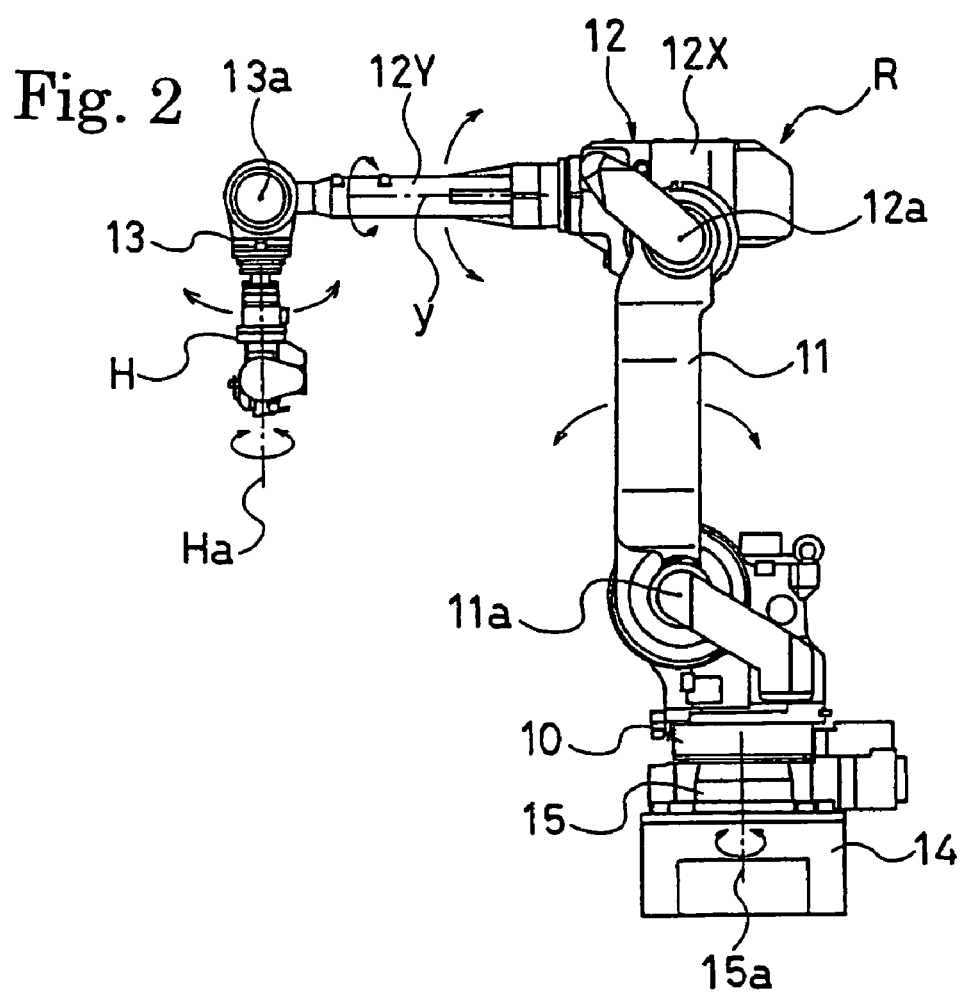
FIG. 2 is a side view showing one example of a multi-joint robot used in the method of forming a spacer of double glazing according to the present invention.

FIG. 2 shows one example of a multi-joint robot used in the double glazing spacer forming method of the present invention. This multi-joint robot R includes a rotary table 10, a first swing arm assembly 11, a second swing arm assembly 12 and a third swing arm assembly 13. The rotary table 10 is fixed to the upper end of an axle 15 which protrudes on a base part 14. When the axle 15 rotates around its vertically extending rotation center axis 15a, the rotary table 10 rotates.

The first swing arm assembly 11, which extends vertically, is connected at its lower end to the rotary table 10. The first swing arm assembly 11 can swing back and forth (right and left in FIG. 3) around its swing center axis 11a, horizontally extending to the right and left sides, located in its lower end.

The second swing arm assembly 12, which extends back and forth, is connected at its rear end to the upper end of the first swing arm assembly 11. The second swing arm assembly 12 can swing up and down around its swing center axis 12a, horizontally extending to the right and left sides, located in its rear end.

The second swing arm assembly 12 comprises a connection arm part 12X connected to the first swing arm assembly 11, and a rotating arm part 12Y which is rotatably attached to the connection arm part 12X. The rotating arm part 12Y rotates around its rotation center axis y extending back and forth.

The third swing arm assembly 13, which extends vertically, is connected at its upper end to the front end of the second swing arm assembly 12. The third swing arm assembly 13 can swing back and forth around its swing center axis 13a, horizontally extending to the right and left sides, located in its upper end.

An applicator head H for applying a spacer forming material is connected at its upper end to the lower end of the third swing arm assembly 13. The applicator head H can rotates around its vertically extending rotation center axis Ha.

The applicator head H is moved along the periphery 1a of the set glass plate 1 by appropriately operating the rotary table 10, first swing arm assembly 11, second swing arm assembly 12 and third swing arm assembly 13 with actuators, not shown.

As shown in FIG. 3, the applicator head H includes a discharge port 20 for discharging a spacer forming material provided at its lower end. A passage 21 for supplying the spacer forming material mixed with a drying agent communicates with the discharge port 20, which is directed to one direction (horizontal direction). The passage 21 has upper and lower wall surfaces 22 and 23, and supply passages 24 and 25 for supplying a primary sealing agent to form the primary sealing agent layers 3 and 4 are open to the lower wall surfaces 22 and 23 near the discharge port 20. Discharged from the discharge port 20 is a layered body into which the spacer forming material and the sealing agent are layered, having the spacer 5 and the primary sealing agent layers 3 and 4 disposed on both of the upper and lower surfaces thereof.

As shown in FIG. 4, means 37 for supplying the spacer forming material mixed with the drying agent and means 38 for supplying the primary sealing agent are connected to the applicator head H through pipes, 31, 32 and 33 and valves 34, 35 and 36.

The double glazing spacer forming method of the present invention will be performed as described below by using the above-described multi-joint robot R and applicator head H.

First, as shown in FIG. 5, a rectangular glass plate 1 is set in a horizontal position. Next, the applicator head H is placed in a start position in a first linear region a1 of the periphery 1a of the upper surface 1X of the glass plate 1. In this event, the discharge port 20 of the applicator head H is directed to a direction opposite to the movement direction of the applicator head H, which is indicated by the arrow K. This opposite direction is an application direction of the applicator head H in four linear regions a1, a2, a3 and a4 of the periphery 1a.

While the applicator head H is being moved in the direction indicated by the arrow K in the first linear region a1 along the periphery 1a by the multi-joint robot R, the spacer forming material and the primary sealing agent are discharged from the discharge port 20 at a constant amount in a strip shape, thereby forming a layered body 8 having the spacer 5 and the primary sealing agent layers 3 and 4 disposed on both of the upper and lower surfaces thereof in the first linear region a1. The movement speed of the applicator head H in the linear region a1 is significantly faster (for example, 120 mm/sec.) than that in the corner regions of the periphery 1a.

When the applicator head H reaches a first corner region b1 of the periphery 1a which follows the first linear region a1, the valves 34, 35 and 36 are closed to stop discharge of the spacer forming material and the primary sealing agent from the discharge port 20. While the applicator head H is being moving in the first corner region b1, the multi-joint robot R rotates the applicator head H to change the direction of the discharge port 20 of the applicator head H, which has stopped discharge of the spacer forming material and the primary sealing agent, to a direction suitable for application in a second linear region a2 of the periphery 1a, which follows the first corner region b1. The movement speed of the applicator head H in the corner region b1 is a speed (for example, 60 mm/sec.) corresponding to the rotation speed of the applicator head H or lower.

Figure 6:
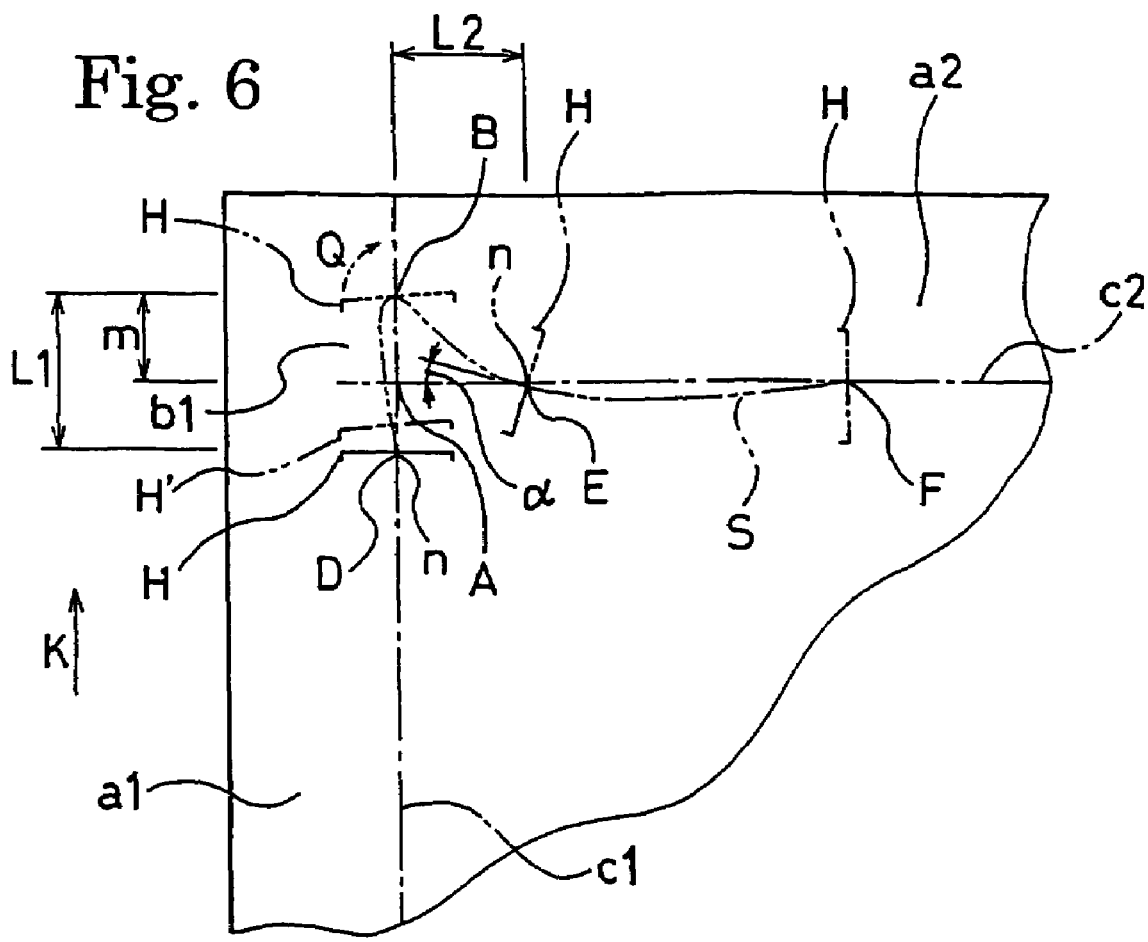
FIG. 6 is a partial plan view showing a preferable process of changing the direction of the discharge port of the applicator head.

FIG. 6 shows one example of a preferred process of changing the direction. If the intersection of an application center line c1 in the first linear region a1 with an application center line c2 in the second linear region a2, located in the first corner region b1, is denoted by reference character A, the applicator head H which has reached the first corner region b1 and stopped discharge of the spacer forming material and the primary sealing agent is moved such that the discharge port 20 passes the intersection A and reaches a position B. Although depending on the spacer forming material and the primary sealing agent, the moved distance m can be set to, for example, about 5 mm. During the movement, it is preferable that the applicator head H is rotated so as to direct the direction of the discharge port 20 slightly inward as indicated by an applicator head H'. The rotation angle of the applicator head is about 1 to 2°.

When the discharge port 20 has moved to the position B, the applicator head H is directed to the second linear region a2 and moved toward the application center line c2 in the second linear region a2, rotating the applicator head H so as to direct the discharge port 20 outward as indicated by the arrow Q. The applicator head H is moved so as to return the discharge center n of the discharge port 20 to the application center line c2 when the applicator head H reaches the second linear region a2.

When the applicator head H reaches the second linear region a2, the valves 34, 34 and 36 are opened to discharge again from the discharge port 20 the layered body 8 in a strip shape comprising the spacer 5 and the primary sealing agent layers 3 and 4 disposed on both of the upper and lower surfaces thereof.

Normally, the distance L1 from the position B to a position D at which the discharge of the spacer forming material and the primary sealing agent is stopped and the distance L2 from the position B to a position E at which the discharge of the spacer forming material and the primary sealing agent is started again may be set to about 10 mm, respectively, in consideration of a residual pressure in the pipes 31, 32 and 33. However, those distances are appropriately determined according to dimensions of the pipes, and the kinds of the spacer forming material and the like. It is preferable, in terms of smooth movement of the applicator head H by the multi-joint robot R and formation of the spacer 5 having a good appearance, that the angle a between the direction of the discharge port 20 and the application center line c2 be set to about 5° at the position E where the discharge is started again, and that the angle α be gradually reduced from the position E and become 0° at a position F which is about 20 mm away from the position E to overlap the discharge center n of the discharge port 20 with the application center line c2.

In FIG. 6, reference character S denotes a locus of movement of the discharge center n of the discharge port 20 in the area from the position D to the position F, indicated by a chain double-dashed line. The locus of movement of the discharge center n of the discharge port 20 in other areas is located on the application center lines. The applicator head H in FIG. 6 is simplified by showing it as a line with its both ends folded for ease of viewing the drawing. The direction of folding is the direction to which the discharge port 20 is directed.

The applicator head H is moved from the second linear region a2 to the first linear region through a second corner region b2, a third linear region a3, a third corner region b3, a fourth linear region a4 and a fourth corner region b4. As in the case of the first corner region b1 described above, the discharge of the spacer forming material and the primary sealing agent from the discharge port 20 of the applicator head H is stopped and the applicator head H is rotated to change the direction of the discharge port 20 in the second to fourth corner regions b2, b3 and b4.

According to the present invention described above, the discharge of the spacer forming material and the primary sealing agent from the discharge port 20 of the applicator head H is stopped in the corner regions b1, b2, b3 and b4. Thus, large amounts of the spacer forming material and the primary sealing agent do not run off a predetermined application region of the glass plate 1 outward. Consequently, even if the applicator head H is moved at a high speed in the linear regions a1, a2, a3 and a4 without depending on the rotation speed of the applicator head H, and, in the meantime, the applicator head H is moved at a speed corresponding to the rotation speed of the applicator head H or lower in the corner regions b1, b2, b3 and b4, the spacer 5 having the primary sealing agent layers 3 and 4 with a good appearance can be formed. Therefore, the spacer 5 having the primary sealing agent layers 3 and 4 with a good appearance can be formed without depending on the rotation speed of the applicator head H in the linear regions a1, a2, a3 and a4, and productivity can be improved.

Since the spacer forming material and the primary sealing agent are in a molten state and soft, even if the discharge of the spacer forming material and the primary sealing agent is stopped in the corner regions b1, b2, b3 and b4, there will occur no such defect as cutting of the layered body 8 in a strip shape.

The spacer 5 having the primary sealing agent layers 3 and 4 with a good appearance can be formed by automatically controlling the application amount from the applicator head H and the movement speed of the applicator head H, which are easily interlocked with each other.

When the applicator head H is moved in each of the corner regions b1, b2, b3 and b4, the applicator head H is moved to the position where the discharge port 20 passes the intersection A. Thereafter, while the applicator head H is being moved toward the linear region a2, a3, a4, a1 which follows the corner region b1, b2, b3, b4, the applicator head H returns to the application center line. Thus, the corners 9 of the spacer 5 including the primary sealing agent layers 3 and 4 (layered body 8) can be formed to have a sharp angle close to right angle. Consequently, appearance can be further improved, and a sufficient width for providing the secondary sealing agent layer 7 can be secured.

In the present invention, the spacer forming material of which the spacer 5 is formed may includes a conventionally known spacer forming material made of rubber, thermoplastic resin, thermoplastic elastomer or the like mixed with a drying agent. Preferably, a thermoplastic material such as thermoplastic resin or thermoplastic elastomer, for example, a thermoplastic elastomer composition disclosed in Japanese patent application Kokai publication No. 2000-119537 or a sealing agent composition including a spacer function and a sealing function, disclosed in Japanese patent application Kokai publication No. 2001-354949, is used for the spacer forming material.

The sealing agent used for the primary sealing agent layers 3 and 4 is not particularly limited as long as the agent has a function of sealing the glass plates 1 and 2; for example, a hot-melt type adhesive formed of a butyl sealing agent composition or the like may be used.

Examples of the glass plates 1 and 2 used for double glazing G1 may generally include glass plates for windows, doors and so on widely used in building materials, vehicles and the like, reinforced glass plates, glass plates in which metal lathe is embedded, glass plates having inner surfaces thinly coated with metal or other inorganic substances such as heat-ray absorbing glass plates, and acrylic resin plates and polycarbonate plates called organic glass plates.

Figure 7:
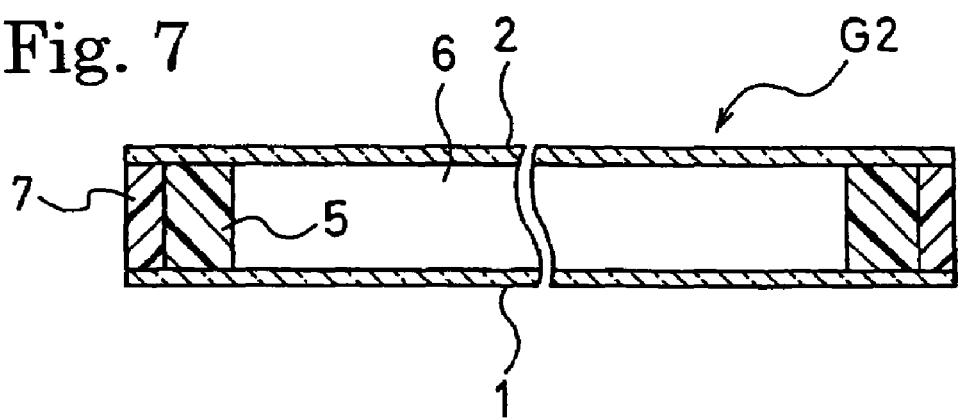
FIG. 7 is a cross-sectional view showing another example of double glazing having a spacer formed by use of the method of forming a spacer of double glazing according to the present invention.

Double gazing for which the double glazing spacer forming method of the present invention is used is not limited to the double glazing G1 shown in FIG. 1, but may include, for example, double glazing G2 shown in FIG. 7. This double glazing G2 has no primary sealing agent layers 3 and 4, and includes only a spacer 5 and a secondary sealing agent layer 7 which are disposed between the glass plates 1 and 2. This spacer 5 is formed of a spacer forming material having a spacer function and a sealing function. For formation of the spacer 5 of the double glazing G2 described above, an applicator head having no supply passages 24 and 25 for supplying the primary sealing agent may be used.

In the embodiment described above, a method of forming a spacer 5 of double glazing having two glass plates 1 and 2 has been described, but when double glazing having three or more glass plates and spacers disposed between the respective glass plates, the double glazing spacer forming method of the present invention can also be used for forming each spacer. The double glazing may be one having a structure with no secondary sealing agent layer 7.

If a spacer 4 having primary sealing agent layers 3 and 4 with a good appearance can be formed by automatically controlling the application amount from the applicator head H and the movement speed of the applicator head H interlocked with each other, the application amount from the applicator head H may be reduced when applied in the corner regions.

INDUSTRIAL APPLICABILITY

The double glazing spacer forming method of the present invention having the beneficial effects described above can be very effectively utilized to form a spacer of double glazing for the purpose of heat insulation, dew condensation prevention, sound insulation and the like in a construction field, an automobile field and the like.

What is claimed is:

1. A method of forming a spacer of double glazing by using a multi-joint robot to which an applicator head for applying a spacer forming material is rotatably attached and by applying the spacer forming material from the applicator head while the applicator head is being moved by the multi-joint robot along a periphery of an upper surface of one glass plate, the application head having a discharge port for the spacer forming material, which is directed to one direction, the periphery of the glass plate having linear regions with corner regions therebetween, the method comprising the steps of:

discharging the spacer forming material from the discharge port of the applicator head in each linear region;

stopping the discharge of the spacer forming material from the discharge port of the applicator head in each corner region;

rotating the application head in each corner region to change the direction of the discharge port of the applicator head to a direction suitable for application in the next linear region adjacent the corner region;

re-starting the discharge of the spacer forming material from the discharge port of the applicator head in the next linear region, such that a continuous spacer is formed in the corner region and the linear regions adjacent thereto, wherein the step of rotating the applicator head in each corner region further includes:

moving the applicator head which has reached the corner region from the linear region until the discharge port passes an intersection A in one of said corner regions, the intersection A being an intersection of application center lines in the linear region and the next linear region; and positioning the discharge port at the application center line in the next linear region adjacent the corner region while the applicator head is being moved toward the next linear region adjacent the corner region; and wherein the step of discharging the spacer forming material in each linear region is performed such that a movement speed of the applicator head is faster in the linear regions than in the corner regions, and the step of rotating the applicator head in each corner region is performed such that the movement speed of the applicator head is equal to or lower than a speed corresponding to a rotation speed of the applicator head.

2. The method of forming a spacer of double glazing according to claim 1, wherein the glass plate is rectangular in shape.

3. The method of forming a spacer of double glazing according to claim 1, wherein the spacer forming material is made of a thermoplastic material mixed with a drying agent.

4. The method of forming a spacer of double glazing according to claim 1, wherein the applicator head applies the spacer forming material and a sealing agent, and the spacer forming material and the sealing agent are discharged in a layered state from the discharge port of the applicator head.

5. The method of forming a spacer of double glazing according to claim 1, wherein the applicator head has the discharge port on one side thereof and while moving the applicator head in a moving direction, the discharge port faces backward with respect to the moving direction of the applicator head.

* * * * *